July 9, 1935.   L. S. WAIT   2,007,263
PETITE PIE PAN
Filed May 7, 1934
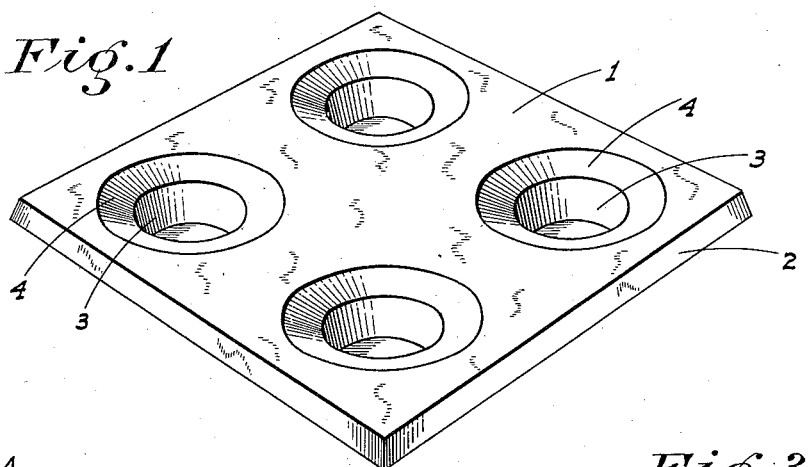
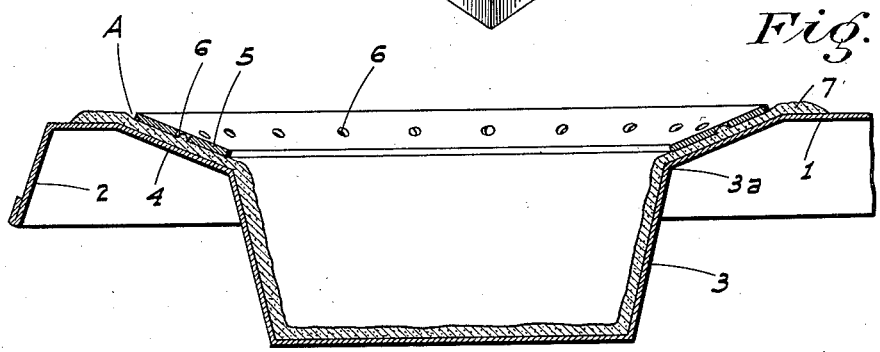
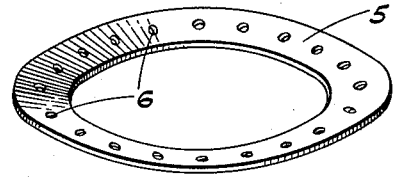
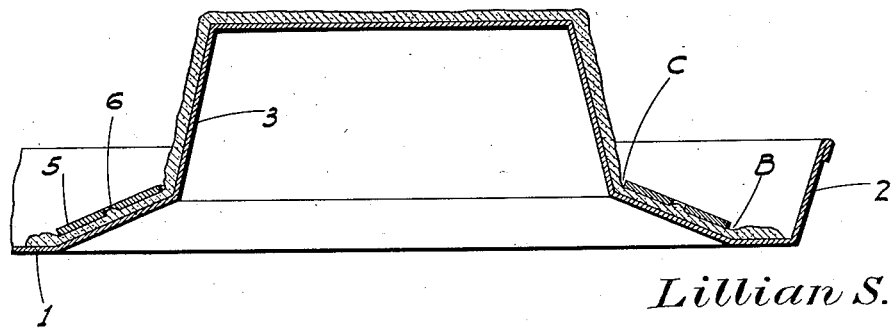
INVENTOR
Lillian S. Wait
BY
ATTORNEY Patented July 9, 1935

2,007,263

UNITED STATES PATENT OFFICE 2,007,263

PETITE PIE PAN

Lillian S. Wait, San Francisco, Calif.

Application May 7, 1934, Serial No. 724,230

4 Claims. (Cl. 53—6)

This invention relates to the culinary art and particularly to a pie pan of small size. The object of the invention is to produce a pan for making small pies and which is adaptable both for the making of pies in which the filling is cooked in the pies at the time the crust is cooked, and also for the making of precooked shells for subsequent filling with fresh fruits, creamed meats, fish and the like.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawing similar characters of reference indicate corresponding parts in the several views:

Figure 1 is a perspective view of my improved pie pan showing that side used when the crust and fillings are to be baked together as a unit.

Figure 2 is a perspective view of a dough cutter ring.

Figure 3 is an enlarged view in section of one of the baking cups showing the dough in position therein when the crust and filling are to be baked as a unit. This view also shows the cutter ring in position prior to the cutting of the edges of the dough in order to shape the pie.

Figure 4 is a view of the same construction as Figure 3 inverted so that the cup is useful for the making of pie shells and showing the cutter ring in place on the reverse side to that shown in Figure 3 for trimming the edges of the shell in the manner and form hereinafter described.

Referring now more particularly to the characters of reference on the drawing, the invention comprises primarily a flat plate 1 having an outwardly flaring edge 2 whereby the plates may be nested for storage, transportation or the like. The plate 1 may carry one or more of the baking cups 3. These cups are tapered as shown and the top edge of each cup as at 3a terminates short of the surface of the plate 1 but is connected thereto by an outwardly flaring ledge 4.

Cutter rings 5 are provided as complementary to the ledges 4 and are substantially of the same width and diameter as said ledges. These cutting rings 5 are provided with relief holes 6 so as to prevent the rings adhering to the dough by suction when applied in the manner hereinafter described.

I will first describe the use of the device as shown in Figure 3. Here the dough 7 is molded down into the inside depth of the cup 3 and over the ledge 4 so as to fully cover the same. The cutter ring 5 is then pressed against the dough so that the same is firmly set between the ring 5 and the ledge 4. Any cutter knife such as a little circular cutter commonly used in the kitchen is then run around the outer edge of the ring 5, as at A, trimming the dough neatly to cause it to fit within the concavity formed by the ledge 4. The cutter ring 5 is then removed, the holes 6 permitting this to be done without lifting the dough. The material to be cooked in the pies, such as fruit or other filling, is then filled into the dough within the cup 3 and a crust dough may be put over the whole if desired, or if not desired, then the pie may be baked as an open-topped one. Suitable fluting may be put on the outer edges of the pie by running the fluter over the dough as it rests against the ledge 4.

Now describing the making of the pie casings as shown in Figure 4, in this operation the cups are inverted from that shown in Figures 1 and 3 and the dough molded over the outside of each cup 3 and over the under side of the ledge 4 as clearly shown in Figure 4. The cutter ring 5 is then fitted down and pressed against the dough to hold it against the under side of the ledge 4 as shown. If casings with projecting flanges are desired, the dough is then cut around as at B and the cutter rings removed and the casings then baked in that form. If a small cup shaped casing is desired without a flange, then the dough is cut around the inner edge of the cutter ring as at C. In either event the edges of the dough may be suitably fluted or crimped or otherwise decorated as may be found desirable. When baked, of course the casings are then removed from the forming cups and when used may be filled with fresh fruit, creamed meats or fish or other desired filling material.

From the foregoing description it will be readily ascertainable that by means of my improved pie pan, small individual pies of various kinds may be readily provided either for initial cooking with the filling therein or for the preparation of casings into which the filling may be thereafter filled. It will also be apparent that pies or casings of a number of forms may be readily prepared and cooked on the same pan, this being essentially provided for by reason of the use of the cutter ring in holding the dough while being trimmed at various points.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. In combination a pie pan having a flaring ledge projecting outwardly from the periphery of the open end of the pan and a cutter ring adapted to selectively engage opposite faces of the ledge.

2. A device as in claim 1 in which the faces of the cutter ring are disposed at an angle relative to the axis of the ring which angle is identical with the angle between said axis and said ledge.

3. A device as in claim 1 in which the ring is provided with a plurality of circumferentially spaced holes whereby to prevent the cutter ring from adhering to the pie dough due to suction.

4. In combination a plurality of pie pans each having an outwardly flaring ledge formed about the edge thereof, a base plate through which the pans open secured to the outer periphery of each ledge and a complementary cutter ring adapted to removably and selectively engage any ledge on opposite sides.

LILLIAN S. WAIT.